United States Patent Office 2,929,843
Patented Mar. 22, 1960

2,929,843
PROCESS FOR THE MANUFACTURE OF METHYL DICHLORO PHOSPHINE OXIDE

Thomas P. Dawson, Bel Air, and Jacob Chernack, Edgewood, Md., assignors to the United States of America as represented by the Secretary of the Army No Drawing. Application September 20, 1949
Serial No. 116,862

4 Claims. (Cl. 260—543)

(Granted under Title 35, U.S. Code (1952), sec. 266)

The invention described herein may be manufactured or used by or for the Government, for governmental purposes, without the payment to us of any royalties thereon.

This invention relates to a novel method of chlorinating various phosphite compounds.

This invention has as its object the preparation of methyl dichloro phosphine oxide.

A further object of this invention is to provide a method for the chlorination of phosphite compounds in which noxious by-products are avoided.

These and other objects are achieved by the process of the present invention, which comprises chlorinating compounds of the alkyl phosphite group with thionyl chloride to form the alkyl chloro phosphine oxide.

The chlorination of compounds of the phosphite group, such as the methyl ester of methyl phosphonic acid, has been attempted in the past, utilizing such chlorinating agents as phosphorous pentachloride. Thus, for example, the methyl ester of methyl phosphonic acid has been chlorinated with phosphorous pentachloride to give the following reaction products:

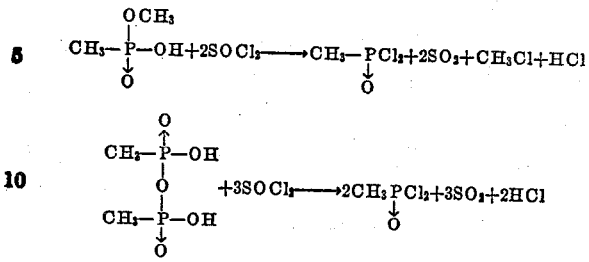

Similarly, pyro methyl phosphonic acid has been chlorinated with phosphorous pentachloride to form methyl dichloro phosphine oxide:

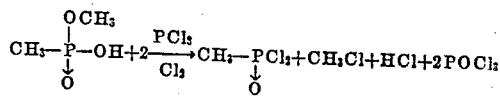

It should be emphasized that the foregoing method of chlorinating has certain acute difficulties; among the most serious being that the by-product phosphorous oxy-trichloride, ($POCl_3$), is a fuming liquid having a boiling point of 107° C., and consequently cannot readily be separated from the remaining products of the reaction. As a result, the reaction products are contaminated, and the foregoing method is not particularly feasible in industrial practice. Furthermore, phosphorous pentachloride is an exceedingly difficult compound to handle on an industrial scale, since it forms crystals of unpleasant smell, volatilizing at moderate temperatures without liquefying, and consequently presents formidable storage and handling problems.

Alkyl phosphites such as those formed from the pyrolysis of dimethyl hydrogen phosphite, namely, the methyl ester of methyl phosphonic acid and pyro methyl phosphonic acid, may readily be chlorinated with thionyl chloride to form methyl dichloro phosphine oxide. Thus, for example, the alkyl phosphite mixture may be chlorinated along the following lines:

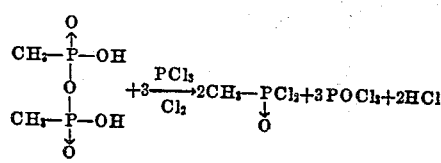

The application of the method of the present invention has the advantage that the by-products, such as sulfur dioxide, are all in gaseous form and hence may readily be separated from the phosphine oxide product. Furthermore, thionyl chloride, being a liquid, is far easier to store and manipulate than phosphorous pentachloride. An example of this method is given below.

Example

A convenient apparatus for the operation comprises a 3-necked flask equipped with a thermometer, brine-cooled scrubber, oil sealed mechanical stirrer, and an outlet for escape of the gaseous by-products.

The pyrolysis products of dimethyl hydrogen phosphite (a mixture of the methyl ester of methyl phosphonic acid and pyro methyl phosphonic acid) are introduced into the flask. The calculated thionyl chloride ($SOCl_2$) charge, which is based on a determination of the methoxyl groups present in the pyrolysis mixture, is then introduced in one portion. The reaction mixture is then heated, with constant stirring, to the reflux point of $SOCl_2$, about 70° to 75° C., for 7 hours. The reaction product consisting of crude methyl dichloro phosphine oxide is then distilled directly from the reaction flask at a reduced pressure of 20–40 mm. The boiling point of the pure methyl dichloro phosphine oxide is 53° C. at 10 mm., 67° C. at 27 mm., and 85° C. at 47 mm. The yield of pure methyl dichloro phosphine oxide, based on dimethyl hydrogen phosphite, is 75–79% of the theoretical.

This method is applicable to all alkyl phosphite compounds, although the preferred starting components comprise the pyrolysis mixture mentioned above. While the preferred reaction temperature is the reflux temperature of the thionyl chloride, i.e., one of the order of 70–75° C., lower temperatures may be utilized although, of necessity, the time of reaction will be longer. In certain cases, such as by the utilization of super-atmospheric pressures, temperatures greater than the reflux temperature of the thionyl chloride may be utilized.

The foregoing example and detailed description have been given for the sake of clarity only and the scope of the invention is not to be construed as limited strictly thereto.

We claim:

1. A process which comprises chlorinating a member of the group consisting of the methyl ester of methyl phosphonic acid, pyromethyl phosphonic acid and the mixed methyl phosphonic acids produced as the pyrolysis products of dimethyl hydrogen phosphite with thionyl chloride at a temperature of about 70° to 75° C. to form methyl dichlorophosphine oxide.

2. A process which comprises chlorinating the mixed methyl phosphonic acids produced as pyrolysis products of dimethyl hydrogen phosphite with thionyl chloride at a temperature of about 70° to 75° C. to form methyl dichlorophosphine oxide.

3. The process which comprises chlorinating the methyl ester of methyl phosphonic acid with thionyl chloride, at a temperature of about 70° to 75° C., to form methyl dichloro phosphine oxide.

4. The process which comprises chlorinating pyro methyl phosphonic acid with thionyl chloride, at a temperature of about 70° to 75° C., to form methyl dichloro phosphine oxide.

References Cited in the file of this patent

UNITED STATES PATENTS

| | | |
|---|---|---|
| 2,365,466 | Hamilton | Dec. 19, 1934 |
| 2,382,309 | Hamilton | Aug. 14, 1945 |
| 2,392,841 | Detrick | Jan. 15, 1946 |

FOREIGN PATENTS

| | | |
|---|---|---|
| 414,572 | Great Britain | Aug. 9, 1934 |

OTHER REFERENCES

Richter's Organic Chem. by Allott (1944), page 208.